Feb. 27, 1951 L. W. COUILLARD 2,543,523

NOISE CONTROL ARRANGEMENT FOR RADIO RECEIVERS AND THE LIKE

Filed Feb. 27, 1946

LUTHER W. COUILLARD
INVENTOR

BY John J. Rogan
ATTORNEY

Patented Feb. 27, 1951

2,543,523

UNITED STATES PATENT OFFICE 2,543,523

NOISE CONTROL ARRANGEMENT FOR RADIO RECEIVERS AND THE LIKE

Luther W. Couillard, Cedar Rapids, Iowa, assignor to Collins Radio Company, Cedar Rapids, Iowa, a corporation of Iowa Application February 27, 1946, Serial No. 650,667

4 Claims. (Cl. 250—20)

This invention relates to radio receivers and more especially to an improved noise control arrangement therefor.

In some radio receivers a signal-operated circuit or squelch circuit is used to control operation of the signal amplifying and reproducing portion of the receiver, so that in the absence of signal or signals below a predetermined threshold level, the reproducer is prevented from reproducing only the noise currents. In such receivers, a high noise level in the absence of signals is often sufficient to operate the squelch control circuit resulting in unintelligible output which tends to distract and annoy the listener.

Accordingly, it is a principal object of this invention to eliminate the unintelligible or noise components from the output of a radio receiver by providing an arrangement for analyzing the signal-to-noise ratio and controlling a squelch circuit in accordance with the results of such analysis.

It is another object of this invention to provide circuit arrangements for integrating and balancing audio frequency components corresponding to values between 100% and 200% modulation, thereby rendering the squelch circuit effective in response to noise pulses of high amplitude and short duration.

It is a further object of this invention to provide a radio receiver which delivers signal output only when the received signal level is above a predetermined threshold level and when the noise level is not great enough to blanket received signals above the said threshold level.

A feature of this invention relates to a special detector arrangement limiting of the noise voltages whereby all noise voltages above a certain predetermined level are shunted to ground.

A further feature relates to the audio amplifier having a grid-controlled amplifier tube, the control grid of which is excited only in response to reception of modulated carrier waves representing not over 100% modulation.

A still further feature relates to the novel organization, arrangement and interconnection of parts which cooperate to produce an improved squelch-controlled amplifier circuit for use in a radio receiver wherein the intelligibility of the signal output of the receiver is not substantially affected by the noise voltages in the detected signals below a predetermined level.

Other objects, features and advantages of this invention will be apparent to those skilled in the art and will be evident from the following descriptions taken in connection with the accompanying drawing in which, Fig. 1 shows in schematic diagram form a typical arrangement which incorporates the improved squelch control system according to the invention.

Figure 1:
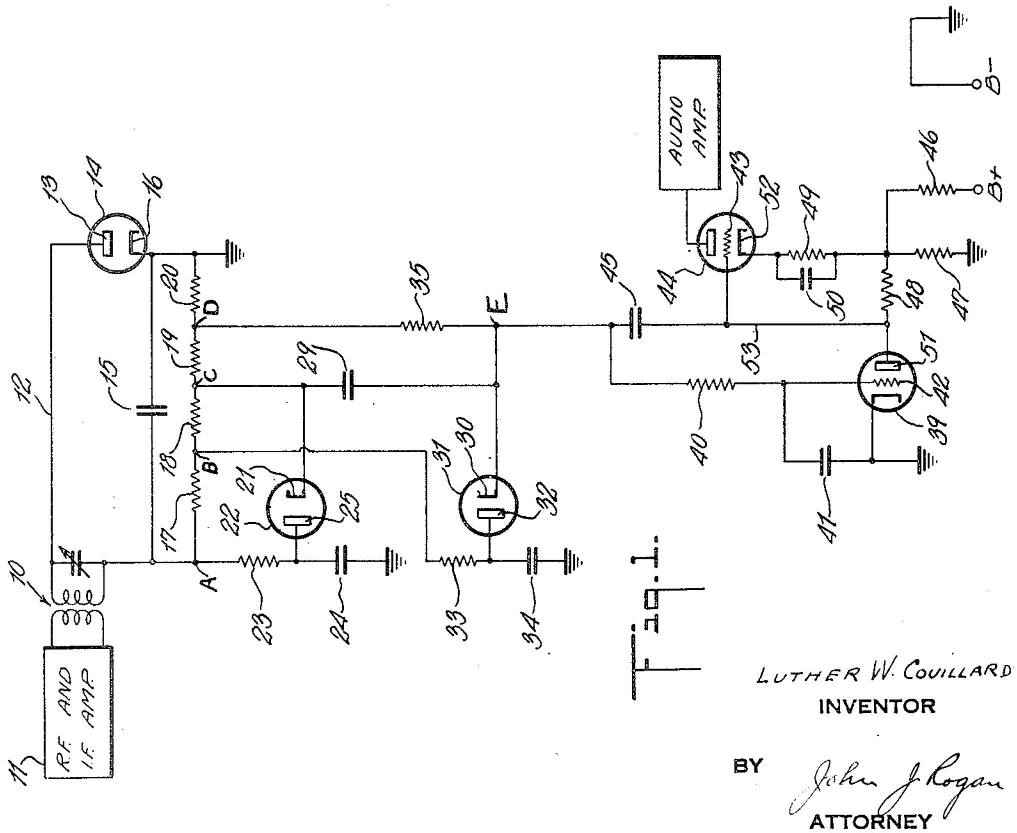

Referring more particularly to Fig. 1, the coupling transformer 10 receives modulated carrier energy from the radio frequency and intermediate frequency stages 11 of a conventional radio receiver, for example of the well-known superheterodyne type. Transformer 10 has the high potential end of its secondary winding connected over conductor 12 to the plate 13 of diode detector tube 14. The low potential end of the secondary of transformer 10 is connected through radio frequency by-pass condenser 15 to the cathode 16 of tube 14. Resistors 17, 18, 19 and 20 connected in parallel with condenser 15 form a voltage dividing load circuit for diode tube 14. In order to simplify the description of this embodiment, a particular value of rectified voltage will be assumed to be present across this load circuit.

If, for example, there is a D. C. voltage of —9 volts at point A, the values of resistors 17, 18, 19 and 20 will be relatively so proportioned, that there will be a voltage of —3 volts at point C. Under this condition, tube 22 is non-conductive. The voltage at point C is applied to the cathode 21 of diode tube 22. Resistor 23 and condenser 24 in circuit with plate 25 of tube 22 serve as a filter network to remove any variations which would otherwise prevent plate 25 from assuming the average D. C. potential of point A.

Figure 2:
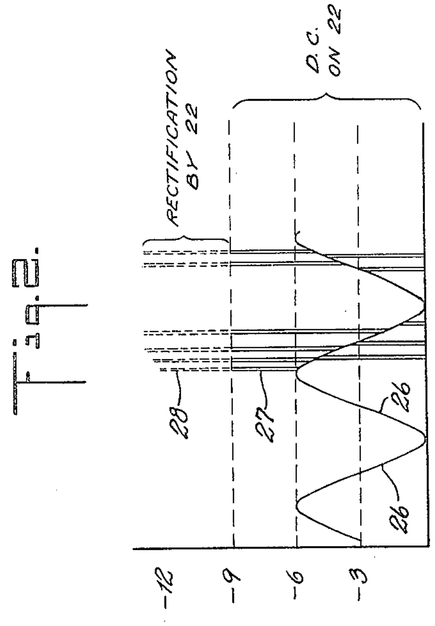
Fig. 2 shows in graph form the action of a portion of the arrangement shown in Fig. 1.

Fig. 2 shows in graph form the action of diode tube 22 when subjected to the demodulated wave which includes noise voltage components. Curve 26 shows the fluctuation of the audio frequency signal component about the —3 volt line which represents the average potential of cathode 21, the fluctuating potential of cathode 21 with respect to ground being represented by curve 26, and the relatively short noise pulses being represented by the curve 27 and by the corresponding extended dotted portions 28. If a negative pulse of audio frequency which exceeds —6 volts is added to the —3 volt potential of cathode 21, the potential of that cathode becomes negative with respect to that of plate 25 and plate current conduction results, thereby shunting to ground through condenser 24 all noise voltages in excess of 9 volts which, for example, may represent a condition of 200% modulation in the radio frequency carrier applied to 11. The component of potential of cathode 21, represented by the solid lines 26 and 27 below the —9 volt line, is not rectified by tube 22, while the components represented by the dotted lines 28 is shunted to ground in the manner above described.

Figure 3:
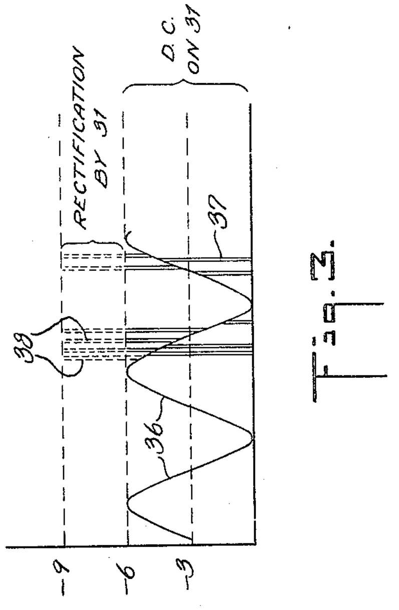
Fig. 3 shows in graph form the voltages acting upon a portion of the circuit shown in Fig. 1.

The limited amplitude audio output wave of tube 22 is conveyed through condenser 29 to cathode 30 of diode tube 31. The plate 32 of tube 31 assumes the potential of point B located between load resistors 17 and 18 and is decoupled from any audio frequency variations by resistor 33 and condenser 34 which constitute a filter for such audio frequencies. The rectified output represented by portions 28 (Fig. 2) caused by the noise components, flows from tube 31 through the resistor 35 connected to point D. The values of resistors 18 and 19 between points B and D connected to plate 32 and cathode 30 respectively, are proportioned to produce a three volt drop across the plate and cathode of tube 31 so that when the potentials at point C representing the average value of the rectified audio frequency voltages from tube 14 and applied to cathode 30 exceed three volts, tube 31 becomes conductive. Preferably, although not necessarily, the resistor 19 is of a low value so as to maintain the above mentioned desired D.-C. potential across the electrodes of tube 31. However, the resistance 19 may be given any desired value depending upon what is chosen as the threshold point of operation of the squelch control tube 39. Tube 31 provides a rectified output which limits the audio output to a value of —6 volts corresponding to 100% modulation and represented by 36 (Fig. 3). Curve 36 represents the fluctuation of the audio frequency component about the average —3 volt potential of cathode 30. The solid lines 37 below the —6 volt line, represent the potential fluctuations on cathode 30, which are not rectified by the action of tube 31, while the noise A.-C. components represented by the dotted lines 38 which are below the —9 volt level and have not been eliminated by tube 22, are rectified by the diode 31. In other words the D.-C. rectified peaks 38 flow through resistance 35. The rectified current from tube 31 flowing through the resistor 35 is of such polarity that it reduces the average negative voltage present at point E, thereby producing a D. C. voltage at point E which becomes more negative with increasing amplitudes of the radio frequency carrier wave up to 100% modulation, but which D. C. voltage becomes less negative as the noise exceeds a value corresponding to 100% modulation of that carrier wave. The audio frequency voltage present at point E under the above assumed conditions is limited to substantially 100% modulation voltage.

The resulting D. C. voltage at point E is used to operate the grid-controlled triode "squelch" tube 39 with resistor 40 and condenser 41 serving to remove the audio frequency fluctuations from the said resulting voltage, and this D. C. voltage is applied to control grid 42. The audio frequency signal voltage fluctuations are conveyed to control grid 43 of audio frequency amplifier 44 through coupling condenser 45. Resistor 46 connected to a source of high positive D. C. potential and resistors 47, 48 and 49 and condenser 50 cooperating therewith are each of such value that suitable positive potential will be applied to plate 51 of squelch tube 39 and cathode 52 of audio amplifier 44. The positive bias voltage applied to cathode 52 is of such value that it is sufficient to stop completely plate current conduction through tube 44 when the control grid 43 of that tube is at ground potential. Plate 51 of tube 39 is connected to control grid 43 of tube 44 by conductor 53, and in operation the control grid 43 is at ground potential when squelch tube 39 is plate current conductive. Hence, if the voltages representing noise which are impressed on control grid 42 of squelch tube 39 rise sufficiently to obscure the intelligence of the received signal, tube 39 becomes plate current conductive, causing the potential on control grid 43 of audio amplifier 44 to be such that tube 44 does not conduct. As the received radio carrier wave is demodulated by diode tube 14, control grid 42 of squelch tube 39 becomes negative and when that grid is sufficiently negative to stop plate current conduction through tube 39, the potential on control grid 43 of audio amplifier tube 44 is above ground potential and that tube conducts, thereby amplifying the signal modulations as received by amplifiers 11. From the foregoing, it will be seen that in effect the audio frequency components corresponding to values between 100% and 200% modulation in the received carrier are integrated and balanced against a portion of the rectified carrier.

While there has been here described a preferred embodiment of this invention, it is understood that various changes and modificaitons may be made therein without departing from the spirit and scope of the invention.

What is claimed is:

1. In a modulated carrier wave receiving system of the type which receives amplitude modulated carrier waves having a predetermined maximum percent of intelligence-signal modulation and accompanied by noise pulses having peak values equivalent to more than said maximum percent modulation, comprising in combination a gating tube having a cathode, an anode and control grid, a grid-controlled amplifier tube whose effectiveness is controlled by the plate current conductivity of said gating tube, means connecting the plate circuit of said gating tube to the control grid of said amplifier tube to selectively bias said amplifier tube to plate current cutoff or to plate current conductivity, a modulation detector having a load circuit for deriving from the received carrier negative audio frequency direct current voltages, said load circuit having first, second, third and fourth taps for supplying respectively decreasing negative direct current voltages, a direct current path from the fourth tap to the control grid of said gating tube, a first noise limiting diode, a second noise limiting diode, means connecting the anode of the first diode to the second tap, means connecting the anode of the second diode to the first tap, means connecting the cathode of the first diode to the fourth tap, means connecting the cathode of the second diode to the third tap, said connections biasing the first diode against conduction until the demodulated voltages are at a level equivalent to said maximum percent modulation and for biasing the second diode against conduction until the demodulated voltages are at a substantially higher level, another connection from the cathode of the first diode to said third tap and including a voltage integrating device, the connection from said cathode of the first diode to said fourth tap also including an impedance for cooperation with said integrating device for developing a positive voltage in proportion to the amount of rectified current passed by said first diode, and means for applying to the control grid of said gating tube a gating control voltage which is the resultant of said positive voltage and the negative voltage at said fourth tap, and circuit connections for rendering said first diode effective to bias said gating control tube to gate the amplifier off for demodulation voltages above said higher level.

2. In a modulated carrier wave receiving system of the type which receives amplitude-modulated carrier waves having a predetermined maximum percent of intelligence-signal modulation and accompanied by noise pulses having peak values equivalent to more than said maximum percent modulation, a signal demodulator having a load circuit, a grid-controlled amplifier tube for the demodulated signals, a pair of peak-limiting rectifier devices, first circuit means connecting one device to said load circuit to bias said one device against conduction when the audio frequency demodulated voltages are below a level representing said predetermined maximum percent modulation, second circuit means connecting the other device to said load circuit to bias said other device against conduction when the demodulated audio frequency voltages are below another level which is higher than the first-mentioned level, the said first circuit means including an impedance connected between the cathode of the first device and said load circuit for developing a positive voltage corresponding to the rectified current from said first device, and circuit connection for combining said positive voltage and a negative threshold voltage from said load circuit to produce a resultant gating control voltage for balancing out noise pulses having an amplitude between the first-mentioned level and said higher level, a gating control tube, and means to apply said resultant gating voltage to said gating control tube to gate it on and off, and a connection from the plate circuit of said gating control tube to the control grid of said amplifier tube to control the effectiveness of said amplifier tube.

3. A noise-limiting arrangement for carrier wave radio receivers of the amplitude-modulated carrier type, comprising in combination a signal demodulator having a load circuit for developing negative demodulation voltages, an audio frequency amplifier for the demodulated voltages, a grid-controlled gating tube, means for selectively disabling said amplifier both for demodulated voltages below a minimum threshold and for demodulated voltages above a level representing a predetermined maximum percent of carrier modulation, a first diode limiter, a connection from the anode of said first limiter to a first point on said load circuit, another connection from the cathode of said first limiter through direct current conductive impedance to a second point on said load circuit which is of lower negative potential than said one point and biassing said first limiter for conduction only when the demodulated voltages in said load circuit are above a predetermined level representing said predetermined maximum percent modulation, a capacitor coupling cathode of said first diode to a third point in said load circuit which is intermediate in negative potential between said first and second points, said impedance also being connected serially between the said second point and the control grid of said gating tube to apply to said control grid a negative biassing component of sufficiently low negative value to gate said amplifier tube off for demodulated voltages below said threshold level and for developing at said control grid a resultant of the positive rectified current of said first limiter and the said negative component when said demodulation voltages are between said first level and a predetermined higher level at which the said amplifier is to be gated completely off, and a second diode limiter which has its cathode connected to said third point and its anode connected to a fourth point which is of higher negative potential than any of said three points and biassing said second diode limiter for conduction only in the presence of demodulated voltages above said higher level.

4. A system according to claim 3 in which the first diode is biassed by its said connections to its load circuit to render it conductive for signal demodulations representing up to 100% modulation of the carrier, and the second diode is biassed by its said connections to said load circuit for conduction for signal demodulations representing more than 200% carrier modulation.

LUTHER W. COUILLARD.

REFERENCES CITED

The following references are of record in the file of this patent:

UNITED STATES PATENTS

| Number | Name | Date |
|---|---|---|
| 2,208,398 | Simons | July 16, 1940 |
| 2,227,197 | Percival | Dec. 31, 1940 |
| 2,239,906 | Tuxen | Apr. 29, 1941 |
| 2,244,639 | Budelman | June 3, 1941 |
| 2,263,633 | Koch | Nov. 25, 1941 |
| 2,273,934 | Campbell | Feb. 24, 1942 |
| 2,279,819 | Fyler | Apr. 14, 1942 |
| 2,345,762 | Martinelli | Apr. 4, 1944 |
| 2,357,983 | Thompson | Sept. 12, 1944 |
| 2,372,934 | Campbell | Apr. 3, 1945 |
| 2,379,799 | Haigis | July 3, 1945 |
| 2,400,948 | Peterson | May 28, 1946 |